(12) United States Patent
Disler

(10) Patent No.: US 11,014,148 B2
(45) Date of Patent: May 25, 2021

(54) METHOD FOR MEASURING AND CONTINUOUSLY MONITORING THE HEAT TRANSFER CHARACTERISTICS OF A FLUID IN A SYSTEM

(71) Applicant: AFC-Holcroft, L.L.C., Wixom, MI (US)

(72) Inventor: William Disler, Wixom, MI (US)

(73) Assignee: AFC-Holcroft, LLC, Wixom, MI (US)

( * ) Notice: Subject to any disclaimer, the term of this patent is extended or adjusted under 35 U.S.C. 154(b) by 600 days.

(21) Appl. No.: 15/714,083

(22) Filed: Sep. 25, 2017

(65) Prior Publication Data

US 2018/0085822 A1    Mar. 29, 2018

Related U.S. Application Data

(60) Provisional application No. 62/398,824, filed on Sep. 23, 2016.

(51) Int. Cl.

| | |
|---|---|
| *G01K 17/08* | (2006.01) |
| *B22D 11/124* | (2006.01) |
| *B22D 11/22* | (2006.01) |
| *G01N 25/00* | (2006.01) |
| *C21D 1/60* | (2006.01) |
| *F24F 11/30* | (2018.01) |
| *F28F 27/02* | (2006.01) |
| *G01N 25/18* | (2006.01) |
| *F24F 12/00* | (2006.01) |

(52) U.S. Cl.
CPC ........ *B22D 11/1241* (2013.01); *B22D 11/225* (2013.01); *C21D 1/60* (2013.01); *F24F 11/30* (2018.01); *G01N 25/005* (2013.01); *F24F 12/002* (2013.01); *F28F 27/02* (2013.01); *G01K 17/08* (2013.01); *G01N 25/18* (2013.01)

(58) Field of Classification Search
CPC ... F01P 7/00; F01P 7/12; G01N 25/18; G01N 33/28; G01K 7/22; G01K 7/16; G01K 7/24; G01K 17/08; G01K 3/06; G01K 7/25; G01K 17/00; G01K 13/00; G01K 7/20; G01K 7/427
See application file for complete search history.

(56) References Cited

U.S. PATENT DOCUMENTS

| | | | | |
|---|---|---|---|---|
| 3,387,834 A | * | 6/1968 | Bricmont | F27B 9/36 432/10 |
| 3,634,840 A | * | 1/1972 | Wilkinson | G01K 3/005 340/595 |
| 4,859,076 A | * | 8/1989 | Twerdochlib | G01K 1/08 374/10 |

(Continued)

FOREIGN PATENT DOCUMENTS

CN    202329858 U  *  7/2012

*Primary Examiner* — Gail Kaplan Verbitsky
(74) *Attorney, Agent, or Firm* — Gunther J. Evanina; Butzel Long, PC

(57) ABSTRACT

A method and apparatus for measuring quench characteristics of a fluid. The apparatus includes a probe with an energy input device electrically connected to a display unit to monitor temperature, media flow characteristics and media heat transfer characteristics. The method includes continuously measuring thermal energy transfer in a quenching media by measuring the surrounding fluid's heat transfer relative to input probe energy.

15 Claims, 1 Drawing Sheet

(56) References Cited

U.S. PATENT DOCUMENTS

| | | | | |
|---|---|---|---|---|
| 4,892,707 | A * | 1/1990 | Stockton | B01J 19/0006 |
| | | | | 374/31 |
| 5,178,022 | A * | 1/1993 | Tomlin | G01N 1/2258 |
| | | | | 73/863.23 |
| 5,601,363 | A * | 2/1997 | Keil | G01N 27/18 |
| | | | | 374/114 |
| 5,837,187 | A * | 11/1998 | Doersing | C21D 1/63 |
| | | | | 266/78 |
| 6,039,471 | A * | 3/2000 | Wyland | G01K 7/01 |
| | | | | 374/43 |
| 6,257,004 | B1 * | 7/2001 | Gendron | B22D 11/225 |
| | | | | 164/455 |
| 6,435,710 | B1 * | 8/2002 | Fauske | G01N 25/4826 |
| | | | | 374/45 |
| 7,683,582 | B2 * | 3/2010 | Zhu | B60K 6/48 |
| | | | | 320/150 |
| 7,748,267 | B2 * | 7/2010 | Olin | G01F 1/684 |
| | | | | 73/204.22 |
| 2010/0236317 | A1 * | 9/2010 | Sigelko | B21D 37/16 |
| | | | | 72/356 |
| 2010/0303258 | A1 * | 12/2010 | Pan | G11B 27/10 |
| | | | | 381/104 |
| 2013/0098150 | A1 * | 4/2013 | Sella | G01F 1/698 |
| | | | | 73/204.17 |
| 2015/0000303 | A1 * | 1/2015 | Hockaday | F02C 7/32 |
| | | | | 60/784 |
| 2015/0192445 | A1 * | 7/2015 | Olin | G01F 1/6842 |
| | | | | 702/45 |
| 2017/0298807 | A1 * | 10/2017 | Gubel | H01M 10/6568 |
| 2018/0274049 | A1 * | 9/2018 | Katsumata | B21B 45/0233 |

\* cited by examiner

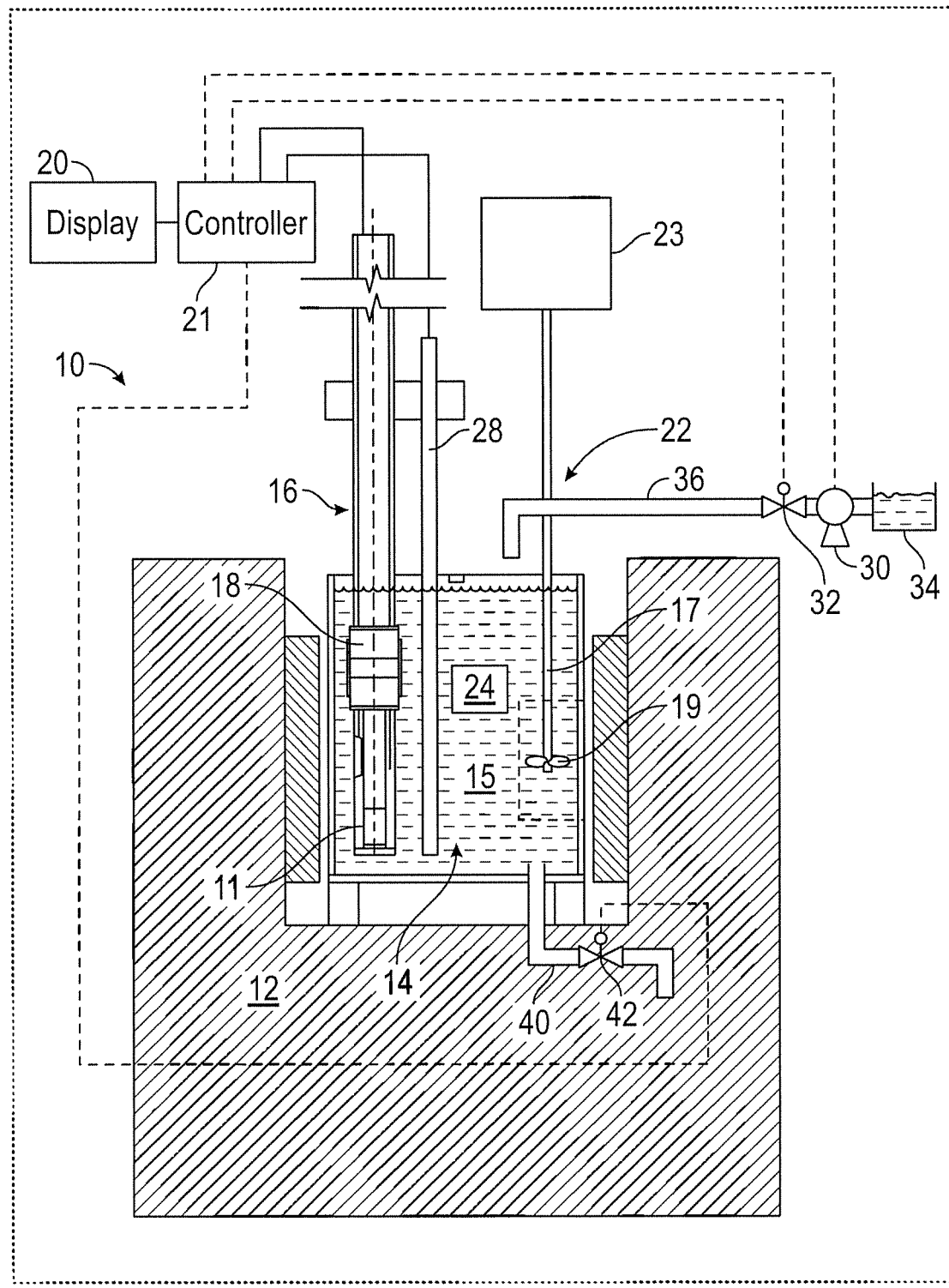

METHOD FOR MEASURING AND CONTINUOUSLY MONITORING THE HEAT TRANSFER CHARACTERISTICS OF A FLUID IN A SYSTEM

CROSS-REFERENCE TO RELATED APPLICATIONS

This application claims priority to provisional Application No. 62/398,824 filed on Sep. 23, 2016, which is incorporated herein by reference in its entirety.

FIELD OF THE DISCLOSURE

This disclosure relates to apparatus and methods for characterizing the ability of a quench medium to cool a heat-treated metal part in the quench medium.

BACKGROUND OF THE DISCLOSURE

Heat treated metal, especially carbon steel, is quenched in a controlled cooling process to obtain desired microstructure and properties. The hardness, strength, toughness and other properties of the finished part depends on the microstructure of the metal, which in turn depends on the time-temperature cooling profile of the part as it is being quenched. The cooling profile is dependent on the composition of the metal part, the geometry of the part, and on the quenching system. For any particular part, most of these factors can be kept constant, including the composition and geometry of the part, the temperature of the heat-treated part immediately before it is quenched, the amount of agitation in the quench medium, the geometry of the quench system, and the initial temperature of the quench medium. However, the ability of the quench medium to cool the part is subject to substantial variation from one quench cycle to the next. This variability can be attributed to loss of volatile component from the quench medium, degradation of components in the quench medium, or from contamination of the quench medium. Other factors that can affect the heat transfer or cooling ability of the quench medium include the extent to which the quench medium is agitated. Any of these factors can significantly change the ability of the quench medium to cool metal parts, resulting in changes in time-temperature profiles, microstructure and physical properties of the quenched parts.

In order to maintain optimum conditions for producing a heat-treated metal part having desirable mechanical properties, such as strength, hardness and toughness, it is important to provide a quench medium having a heat transfer characteristic or cooling ability that is known to be conducive to achieving the time-temperature profile needed to produce the desired microstructure and properties of the quenched metal product.

SUMMARY OF THE DISCLOSURE

The disclosed apparatus is designed to measure a parameter that is indicative of the ability of a quench medium to effectively transfer heat from a heat-treated metal object to the quench medium in accordance with a predetermined time-temperature profile that is known to produce a quenched object having desired microstructure and mechanical properties, such as a desired hardness. The apparatus is capable of measuring a parameter that is indicative of the cooling ability of the quench medium before the heat-treated metal object is introduced into the quench medium, and continuously measuring such parameter, as desired, during a quenching process. Such measurements allow adjustments to be made to the quench medium as needed before the quenching process is initiated, during the quenching process, or both before and during quenching of a metal object.

The apparatus disclosed herein includes a probe body having a heating element that is in thermal communication or intimate contact with the probe body to facilitate heating of the probe body as desired or needed to maintain the probe body at a predetermined temperature, at a predetermined temperature above the temperature of a quench medium, or at scheduled temperatures during a quenching process. The apparatus also includes a first temperature sensor in thermal communication or intimate contact with the probe body to provide a temperature measurement that is indicative of the average or bulk temperature of the probe body, and a second temperature sensor that is disposed in the quench medium and maintained in a predetermined or fixed spaced relationship from the probe body to provide a temperature that is indicative of the average or bulk temperature of the quench medium.

A controller receives temperature measurements from the first and second temperature sensors, regulates power to the heating element to control the temperature of the probe body, and measures or quantifies the power needed to control the temperature of the probe body. This power measurement is indicative of and can be correlated to the ability of the quench medium to transfer heat as required or prescribed during a quenching process, and can be used to determine whether and to what extent, adjustments should be made to the quench medium before or during a quenching process. Such adjustments may include adding materials to the quench medium, removing quench medium, and increasing or decreasing agitation. Such adjustments can be performed manually or the controller could be used for operating valve(s), pump(s), or agitator motor(s) to achieve the desired adjustments.

A method of measuring a parameter characteristic of an ability of a quench medium to cool a heat-treated metal part includes providing a quenching vessel containing a volume of quench medium suitable for quenching a heat-treated metal object in the vessel. In accordance with the disclosed method, a probe body is positioned in the vessel. The probe body has a heating element in thermal communication or intimate contact with the probe body to facilitate heating of the probe body to a desired temperature. A first temperature sensor is positioned in thermal communication with the probe body to provide a temperature signal indicative of the temperature of the probe body. A second temperature sensor is positioned in the quench medium in a predetermined spaced relationship from the probe body to measure a temperature indicative of the average or bulk temperature of the quench medium and provide a temperature signal. The temperature measurements from the sensors are received and compared to determine a temperature difference between the heated probe body and the quench medium. The process further includes regulating power to the heating element to control the temperature of the probe body and measuring the power needed to control the temperature of the probe body. The measured power requirements and temperature difference can be used to develop a parameter that is indicative of the ability of the quench medium to transfer heat from an object being quenched. This allows the heat transfer characteristic of the quench medium to be adjusted before or during a quenching process as needed to provide heat transfer conducive with achieving a desired time-temperature profile of the object being quenched which is known to yield desired microstructure and mechanical properties.

BRIEF DESCRIPTION OF THE DRAWINGS

FIG. 1 is a schematic illustration of an apparatus with a quench severity probe capable of measuring the practical heat transfer characteristics of a quench medium.

DETAILED DESCRIPTION OF THE EMBODIMENTS

Apparatus 10 includes a quenching station 12, wherein a quenching vessel 14 may be situated. The quenching vessel contains a sufficient volume of a suitable quenching fluid 15. The fluid is understood to be either a liquid or a gas, depending upon the quenching process needed to impart the desired properties into the quenched product 24.

The quenching fluid or quench medium can be a liquid such as water, brine, molten salt (e.g., sodium nitrate, sodium nitride, etc.), a mineral oil, or a vegetable oil. In some cases, mixtures of these and other liquids may be used. The quenching fluid or quench medium can also be a gas such as air, nitrogen or a nobel gas (e.g., helium, neon, argon, radon, krypton, xenon). In some cases, mixtures of these and other gases may be used.

The apparatus includes a probe body 16 and a heating element 18 in thermal communication with the probe body. Heating element 18 can be configured to have a fixed or varied input of energy and may be placed directly into the medium being monitored. The probe can be electrically connected to a display unit 20 via a controller 21. The controller may also operate as the energy source for the heater in the probe. The apparatus may optionally be provided with an agitator 22 equipped with impeller blades 19 on shaft 17 to circulate the quench media to maintain a relatively uniform temperature, heat transfer and phase change consistency of the quench media. The agitator is connected to a drive 23. A first temperature probe 11 is in intimate contact with probe body 16 to provide a temperature measurement that is characteristic of the average or bulk temperature of the probe body. Temperature sensor 11 is preferably embedded within probe body 16. In addition, because the probe is capable of measuring heat transfer continuously, it may be applied within production heat treatment systems to improve quench process consistency and reliability. It has been known to continuously measure the temperature of the quench media. However, it is considered new to continuously measure the practical heat transfer characteristics and severity of various quench media. It has been determined the probe and display as described makes possible new quench media monitoring and more reliable closed loop control of additives and or dynamic variations in the quench media.

A second temperature sensor 28 is positioned in quench medium 15 in spaced relationship from probe body 16 to provide a temperature measurement that is indicative of the average or bulk temperature of the medium 15. The measured temperature difference ($\Delta T$) between the heated probe body 16 and medium 15 is proportional to the heat transfer (Q) between the probe body and the medium divided by the product of the heat transfer coefficient (h) and the surface area (A) of the probe body ($Q=hA\Delta T$). The power to the heating element is proportional to the heat transfer from the probe body to the medium. Therefore, a characteristic heat transfer coefficient between the probe body and the medium is proportional to the time-average power supplied to the heating element divided by the measured temperature difference between the probe body and the medium during this time period. This characteristic heat transfer coefficient can be used as an indicator of the heat transfer from part 24 to medium 15. Thus, heat transfer from part 24 to medium 15 can be characterized by measuring and/or continuously monitoring the amount of power needed to maintain a prescribed temperature difference between the probe body 16 and medium 15. Such measurements can be used to adjust the quench medium before a quenching process is initiated or, if deemed necessary, replace an unsuitable quench medium with fresh quench medium. Apparatus 10 can also be used in a method for continuously monitoring and adjusting the heat transfer characteristics of the quench medium during a quenching process to achieve a desired time-temperature profile for object 24 that will yield desired microstructure and mechanical properties in the quenched object 24. Such adjustments can be made by modifying the composition of quench medium 15, such as by operating a pump 30 and/or opening a valve 32 to deliver material from a reservoir 34 to vessel 14 via conduit 36 and/or withdrawing or draining quench media 15 from vessel 14 via conduit 40 by opening valve 42. Valves 32, 42 and pump 32 can be operated manually or operated by controller 21. The heat transfer characteristic can also be adjusted by controlling the speed of impeller 19 (i.e., adjusting the amount of agitation of medium 15 in vessel 14).

It is envisioned that the heat-treated metal object 24 will have an initial temperature (at the start of the quench process) that is about 1500° F.-1600° F., that the temperature of the quench medium 15 will typically be about 100° F. to 700° F., and that the probe body will typically be maintained at a temperature that is about 10° F. to 20° F. greater than the temperature of the medium 15.

In the case of molten salt medium 15, it has been found that a small amount of added water (about 1% by weight) provides enhanced heat transfer. Accordingly, it is possible to monitor the heat transfer characteristic of medium 15 and make adjustments during the quenching process by adding water to the medium 15.

Temperature sensors 11 and 28 can independently be thermocouples, thermistors, silicon bandgap temperature sensors, resistance thermometers, or other types of temperature sensing devices.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or description that the steps are to be limited to a specific order, it is no way intended that any particular order be inferred.

While several embodiments have been described, it is apparent to those of ordinary skill in the art that the words used are not terms of limitation, but rather terms of description. Many variations and modifications are possible without departing from the scope and spirit of the invention as set forth in the appended claims.

What is claimed is:

1. An apparatus for measuring a parameter characteristic of an ability of a quench medium to cool a heat-treated metal part in the quench medium, comprising:
   a probe body disposed within the quench medium;
   a heating element for heating the probe body relative to the quench medium;

a first temperature sensor for measuring a temperature of the probe body;

a second temperature sensor disposed in the quench medium in a predetermined spaced relationship from the probe body for measuring the temperature of the quench medium; and a controller for measuring the power needed to maintain a predetermined temperature difference between the temperature of the probe body and the temperature of the quench medium, and for adjusting a condition affecting the ability of the quench medium to transfer heat based on the power needed to maintain the predetermined temperature difference.

2. The apparatus of claim 1, wherein the controller is configured to maintain a constant temperature difference between the probe body and the quench medium.

3. The apparatus of claim 1, wherein the controller is configured to maintain a constant probe body temperature.

4. The apparatus of claim 1, wherein the controller is configured to adjust the probe body temperature in accordance with a schedule during a quenching process.

5. The apparatus of claim 1, wherein the controller is configured to adjust the difference between the probe body temperature and the quench medium temperature in accordance with a schedule during a quenching process.

6. The apparatus of claim 2, wherein the probe body is maintained at a temperature that is 10° F. to 20° F. higher than the temperature of the quench medium.

7. The apparatus of claim 1, wherein the first temperature sensor is contained within the probe body.

8. The apparatus of claim 1, wherein the probe body and temperature sensors are disposed in a quench medium selected from water, brine, mineral oil, vegetable oil, and molten salt.

9. The apparatus of claim 1, wherein the probe body and temperature sensors are disposed in a quench medium selected from nitrogen, air, helium, neon, argon, radon, krypton, xenon and mixtures of these gases.

10. The apparatus of claim 1, wherein the first and second temperature sensors are independently one of a thermocouple, a thermistor, a silicon bandgap temperature sensor, and a resistance thermometer.

11. The apparatus of claim 1, wherein the controlled condition is a speed of an agitator having an impeller disposed in the quench medium.

12. The apparatus of claim 1, wherein the controlled condition is replacement of at least a portion of the quench medium with fresh quench medium.

13. An apparatus for measuring a parameter characteristic of an ability of a quench medium to cool a heat-treated metal part in the quench medium, comprising:

a probe body disposed within the quench medium;

a heating element for heating the probe body relative to the quench medium;

a first temperature sensor for measuring a temperature of the probe body;

a second temperature sensor disposed in the quench medium in a predetermined spaced relationship from the probe body for measuring the temperature of the quench medium; and a controller for measuring the power needed to maintain a predetermined temperature difference between the temperature of the probe body and the temperature of the quench medium, and for adjusting a condition affecting the ability of the quench medium to transfer heat based on the power needed to maintain the predetermined temperature difference, wherein the controlled condition is an addition of a heat transfer modifying material to the quench medium.

14. The apparatus of claim 13, wherein the quench medium is a molten salt and the heat transfer modifying material is water.

15. A method of measuring a parameter characteristic of an ability of a quench medium to cool a heat-treated metal part disposed in the quench medium, comprising:

providing a quenching vessel containing a volume of quench medium suitable for quenching a heat-treated metal part in the vessel;

positioning a probe body in the quench medium;

heating the probe body relative to the quench medium with a heating element;

measuring the temperature of the probe body;

measuring the temperature of the quench medium at a predetermined spaced relationship from the probe body;

regulating power to the heating element to maintain a predetermined temperature difference between the probe body and the quench medium; and adjusting a condition affecting the ability of the quench medium to transfer heat based on the power needed to maintain the predetermined temperature difference.

* * * * *